Aug. 16, 1966 T. HUDSPETH 3,267,392

BALANCED PHASE MODULATOR

Filed April 18, 1960

INVENTOR.
THOMAS HUDSPETH,
BY
Noel B. Hammond
AGENT 3,267,392
BALANCED PHASE MODULATOR
Thomas Hudspeth, Malibu, Calif., assignor to Hughes Aircraft Company, Culver City, Calif., a corporation of Delaware
Filed Apr. 18, 1960, Ser. No. 22,997
8 Claims. (Cl. 332—18)

Figure 1:
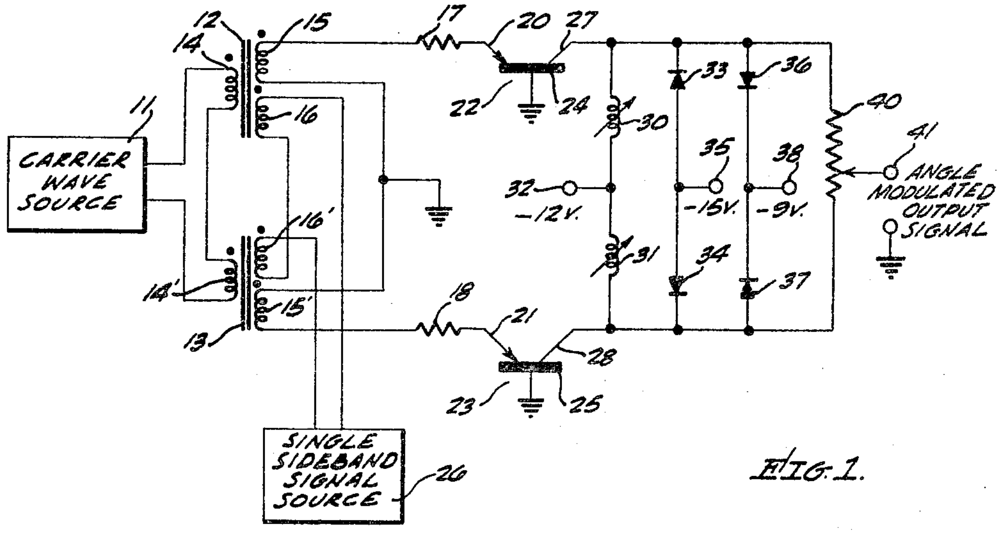

The present invention relates to phase modulation of a carrier wave and, more particularly, to a circuit for producing a phase-modulated wave having a large phase deviation with substantially no distortion of the rate-of-change-of-phase, and having substantially no amplitude modulation.

In relaying radio signals, it may sometimes be convenient to retransmit a single sideband signal as a phase modulated or frequency modulated signal. This may be the case, for example, in the use of a communications satellite as a radio relay. A single sideband signal may be easily produced at a transmitting station and transmitted to a radio relay station at a relatively high power level and with a narrow beam width, but circuitry for amplifying and retransmitting a single sideband signal without change is complex. Therefore, it is sometimes advantageous to retransmit a single sideband signal at a higher frequency as a frequency modulated signal to provide a high signal-to-noise ratio at a final receiving point. At the radio relay station, the single sideband signal could be demodulated and then applied to a phase modulator for phase modulation of a carrier wave. However, demodulation of single sideband signals and followed by phase modulation of a carrier wave require the use of unduly complex circuitry.

Accordingly, it is an object of the present invention to provide a circuit for directly phase modulating a carrier wave with a single-sideband signal.

Another object of the invention is the provision of a circuit for phase modulating a carrier wave which produces a relatively large phase deviation.

Yet another object of the present invention is to provide a circuit for phase modulating carrier wave which does not introduce substantial amounts of distortion of rate-of-change-of-phase.

A further object of the invention is the provision of a circuit for phase modulating a carrier wave which introduces substantially no amplitude modulation.

In accordance with these and other objects of the invention, a balanced circuit is provided in which a modulating signal is combined with a carrier wave in such a manner as to produce two small deviation phase-modulated signals having equal amplitudes but which have out-of-phase carrier wave components. The two phase-modulated signals are combined in such a proportion as to produce a phase-modulated output signal having a moderate phase deviation by cancellation of portions of the out-of-phase carrier wave components without introducing substantial amounts of rate-of-change-of-phase distortion or amplitude modulation.

The following specification and the accompanying drawing, respectively, describe and illustrate an exemplification of the present invention. Consideration of the specification and the drawing will provide a complete understanding of the invention, including the novel features and objects thereof. Like reference characters are used to designate like parts throughout the figures of the drawings.

Figure 2:
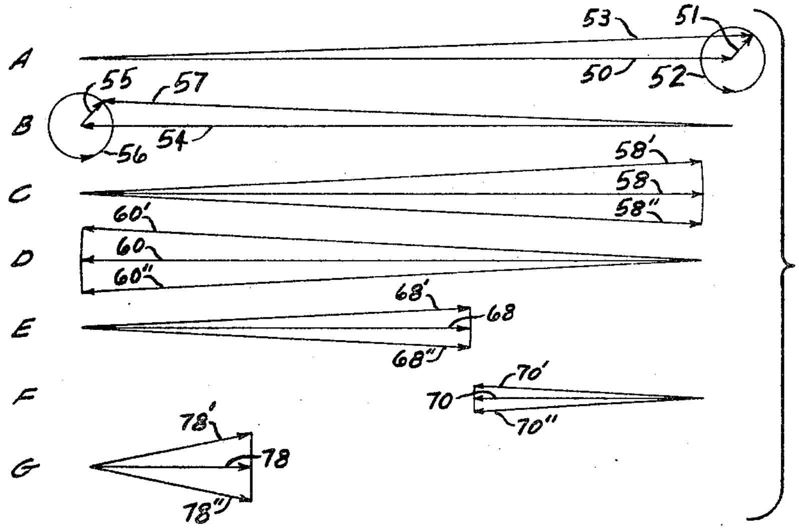

FIGURE 1 is a circuit diagram of an exemplary embodiment of a balanced phase modulator in accordance with the invention; and FIGURE 2 is a vector diagram illustrating the operation of the circuit of FIGURE 1.

Referring now to FIGURE 1, a carrier wave source 11 is provided and may be, for example, a stable master oscillator. The frequency of the carrier wave produced by the carrier wave source 11 is, in the present example, 43.25 megacycles per second. The output of the carrier wave source 11 is connected to first and second identical hybrid transformers 12 and 13, each having first, second and third windings 14, 15, 16 and 14′, 15′ and 16′, respectively. The phase relationship of the windings 14–16 and 14′–16′ is indicated by the dots in FIG. 1. The carrier wave source 11 is connected to the first windings 14 and 14′ in a serial relationship to apply the carrier wave signal to each winding 14 and 14′ with the same phase. The second windings 15 and 15′ are also connected in series and are phased in a series-aiding relationship. The common junction of the second windings 15 and 15′ is connected to a point of fixed potential shown as ground in FIG. 1. The outside ends of the second windings 15 and 15′ are each individually connected to first and second resistors 17 and 18, which have a resistance of 100 ohms in the present example. The remaining ends of the resistors 17 and 18 are each individually connected to different emitters 20 and 21 of first and second identical transistors 22 and 23, respectively. The bases 24 and 25 of the transistors 22 and 23 are connected to ground. The transistors 22 and 23 are of the PNP type and may be, for example, the type 2N1143 transistors manufactured by the Texas Instrument Company. The purpose of the two resistors 17 and 18 is to swamp out differences in emitter resistances of the two transistors 22 and 23. The carrier wave from the carrier wave source 11 is applied with equal amplitude, but with opposite phase to the input circuits of each of the transistors 22 and 23.

A single sideband signal source 26 is also connected to the two transformers 12 and 13. The single-sideband signal source 26 may be, for example, a radio receiver tuned to receive single-sideband signals transmitted from a single-sideband transmitter. By single-sideband signals, is meant only those components of a modulated signal on one side of the carrier wave. In the present example, the single-sideband signals occupy a frequency band from 43.25 to 48.25 megacycles per second. The single-sideband signal source 26 is connected serially to the third windings 16 and 16′ of the transformers 12 and 13, but with the single-sideband signal being applied with opposite phases to the two windings 16 and 16′. That is, the outside end of one of the windings 16 is connected to the inside end of the other winding 16′, the inside end of the first winding 16 and the outside end of the second winding 16′ being connected to the single-sideband signal source 26. Thus, the single-sideband signals will be applied to the input circuits of the transistors 22 and 23 with equal amplitudes and with the same phase.

The carrier wave source 11 is adjusted to provide a signal amplitude at the input circuits of the transistors 22 and 23, which is 100 times as great as the amplitude of the single-sideband signal applied thereto. The transistors 22 and 23 each have collectors 27 and 28 which are each individually connected to one end of different ones of first and second tuning inductors 30 and 31. The remaining ends of the inductors 30 and 31 are joined together. At the junction of the tuning inductors 30 and 31 a negative potential is applied at a terminal 32 with respect to ground, to provide an operating potential for the transistors 22 and 23. In the present example, this potential may be minus 12 volts with respect to ground. The tuning inductors 30 and 31 are each individually resonated with the output capacitance of their associated transistors 22 and 23, respectively, at frequencies within the band of 43.25 to 48.25 megacycles per second.

A first pair of diodes 33 and 34 is connected serially and with opposite polarity between the collectors 27 and 28 of the transistors 22 and 23. The cathodes of each of the diodes 33 and 34 are connected to the collectors 27 and 28, and the anodes of the diodes 33 and 34 are connected together and joined to a terminal 35 at which is applied a negative potential with respect to ground. This potential may be, for example, minus 15 volts with respect to ground. A second pair of diodes 36 and 37 are connected serially and with opposite polarity between the emitters 27 and 28 of the transistors 22 and 23. The anodes of these two diodes 36 and 37 are connected to the collectors 27 and 28, while the cathodes of the diodes 36 and 37 are joined together and connected to another terminal 38, to which is applied another negative potential with respect to ground. This negative potential may be minus 9 volts with respect to ground. The outer ends of a potentiometer 40 are each individually connected to the collectors 27 and 28 respectively, of the transistors 22 and 23. The slider of the potentiometer 40 is connected to an output terminal 41 at which an output signal appears with respect to ground.

Referring now to FIG. 2, the operation of the circuit of FIG. 1 will be described. The carrier wave from the carrier wave source 11, applied to the emitter 20 of the first transistor 22 is represented by the vector arrow 50 of FIG. 2–A. The single-sideband signal from the single-sideband signal source 26 applied to the emitter 20 of the first transistor 22 is represented by the smaller vector arrow 51. FIG. 2 is not drawn to scale, inasmuch as the carrier wave vector arrow 50, should be 100 times longer than the single-sideband signal vector arrow 51 for the signal amplitudes of the present example.

The frequency of the single-sideband signal is varying with respect to the carrier wave. Accordingly, the single-sideband signal vector arrow 51 is illustrated in FIG. 2–A as rotating with respect to the carrier wave vector arrow 50 by the circular arrow 52. The resultant signal at the emitter 20 of the first transistor 22 is represented by the resultant signal vector arrow 53. As the single-sideband signal varies in frequency with respect to the frequency of the carrier wave, the single-sideband signal vector arrow 51 rotates with respect to the carrier wave vector arrow 50, causing the resultant signal vector arrow 53 to increase and decrease in length and, to form an angle relative to the carrier wave vector arrow 50. Thus, the resultant signal is both a phase and amplitude modulated signal.

The carrier wave signal applied to the emitter 21 of the second transistor 23 is equal in amplitude but opposite in phase to the carrier wave signal applied to the first transistor 22. This is indicated by the carrier wave vector arrow 54 of FIG. 2–B, which is identical in length to the carrier wave vector arrow 50 of FIG. 2–A, but is opposite in direction. However, the single-sideband signal applied to the second transistor 23 is identical in both amplitude and phase to the single-sideband signal applied to the first transistor 22. This is indicated by the single-sideband vector arrow 55 of FIG. 2–B which is identical in length and direction to the single-sideband signal vector arrow 51 of FIG. 2–A. The single-sideband signal vector arrow 55 also is indicated as rotating with respect to the carrier wave vector 54 as indicated by the circular arrow 56. The resultant signal at the input of the second transistor 23 is indicated by the resultant signal vector 57.

The resultant signals are amplified by the two transistors 22 and 23, and passed by the two tuned circuits comprising the tuning inductors 30 and 31 and the output capacitance of the transistors 22 and 23, and the amplified signal is applied to the diodes 33, 34, 36 and 37. Due to their respective bias voltages and their polarities, the diodes 33, 34, 36 and 37, limit the output signal from the transistors 22 and 23 in amplitude to be within the limits of minus 9 volts and minus 15 volts. That is, plus or minus 3 volts on either of the transistor bias voltage of minus 12 volts applied at terminal 32 with respect to ground. The amplitude-limited output signal at the collector 27 of the first transistor 22 is indicated in FIG. 2–C. The resultant output signal arrow 58 is indicated as changing phase with respect to the phase of the carrier wave by the two outside arrows 58′ and 58″. That is, as the frequency of the single-sideband signal varies with respect to the frequency of the carrier wave, the resultant output signal arrow 58 varies in angle between the positions indicated by the outside arrows 58′ and 58″. However, the length of the arrows 58, 58′, 58″ is constant due to the amplitude limiting produced by the diodes 33, 34, 36 and 37. The amount of the phase deviation is however, small, as indicated by the angle between the outside arrows 58′ and 58″. In the example given, the carrier wave amplitude is 100 times greater than the amplitude of the single-sideband signal which produces a phase deviation of approximately .01 radian.

If the amplitude of the carrier wave were decreased in proportion of the amplitude of the single-sideband signal to increase the phase deviation, then distortion would be produced. The rate-of-change of the phase deviation angle of the phase modulated signal would no longer be sinusoidal, but would be distorted. That is, referring to FIG. 2–A, as the single-sideband signal vector arrow 51 sweeps around the circle on the in-phase or right-hand side of the carrier wave vector arrow 50, the resultant signal vector arrow 53 changes its angle with respect to the carrier vector arrow wave 50 relatively slowly as compared to when the single-sideband signal vector arrow 51 is on the out-of-phase or left-hand side of the circular arrow 52. This effect is greater in proportion as the length of the carrier wave vector arrow 50 is reduced with respect to the length of the single-sideband signal vector arrow 51. Accordingly, increasing the phase deviation by decreasing the ratio of the signal amplitudes is not practical.

FIG. 2–D indicates the output signal at the collector 28 of the second transistor 23. Here an equal-amplitude, but out-of-phase signal is produced relative to that at the collector 27 of the first transistor 22. Thus, the arrow 60 of FIG. 2–D corresponds to the arrow 58 of FIG. 2–C, to which it is equal in amplitude but opposite in direction. As the frequency of the single side-band signal changes with respect to the carrier wave the output signal at the second transistor 23 changes in phase with respect to the carrier wave and produces phase modulation indicated by the angle between the outer arrows 60′ and 60″.

FIG. 2–F, represents the amount of signal from the first transistor 22 which appears at the output terminal 41 when the slider of the potentiometer 40 is set slightly off center. The arrows 68, 68′ and 68″ correspond to the arrows 58, 58′ and 58″ of FIG. 2–C, but are reduced somewhat in length. Similarly, FIG. 2–F indicates the signal appearing at the output terminal 41 from the second transistor 23 and arrows 70, 70′ and 70″ correspond to the arrows 60, 60′ and 60″ of FIG. 2–D, but are greatly reduced in length corresponding to a reduction in amplitude of the signal by the potentiometer 40. Inasmuch as the carrier wave components of the signals at the output terminal 41 are out of phase, as indicated by the opposing direction of arrows 68, 68′ and 68″ relative to arrows 70, 70′ and 70″, the carrier wave components cancel, leaving the resultant shown in FIG. 2–G as arrows 78, 78′ and 78″ which correspond to the remainder of arrows 68, 68′ and 68″ of FIG. 2–E after the arrows 70, 70′ and 70″ are subtracted therefrom. However, the single-sideband signal components have an additive phase and therefore the angle between the outer arrows 78′ and 78″ of FIG. 2–G is greater than the angle between the outer arrows of FIGS. 2–C or 2–D. Thus, by combining the signals from the two transistors 22 and 23, the phase deviation angle is increased without causing distortion in the rate of change of the phase However, as the slider on the potentiometer 40 is moved close to the center and the phase deviation increases, amplitude distortion becomes considerable. As will be noted in FIG. 2–G, the outside arrows 78′ and 78″ are slightly longer than the center arrow 78. There is an optimum point for the slider of potentiometer 40 where a reasonably large phase deviation may be produced without introducing an appreciable amplitude modulation. This point has been found to be where the carrier wave component is reduced by a factor of 10 and where a phase deviation of approximately .1 radian is achieved. This corresponds to a setting of the slider of the potentiometer 40 at a point approximately 5% of the total resistance of the poteniometer 40 from the center position.

Thus, a phase-modulated signal is produced at the output terminal 41. It will be understood that this phase-modulated signal may be easily converted to a frequency modulated signal by the addition of a simple resistance-capacitance network at the output terminal 41, as both phase an frequency modulation are forms of angle modulation. It should be apparent that although the present embodiment of the invention has been described with reference to modulating a carrier wave with a single-sideband signal, a carrier wave may be modulated in this manner by any type of signal. It is only necessary that the modulating signal have a frequency in a band close to, but not including, the frequency of the carrier wave.

Thus, there has been described a circuit arrangement for phase modulating a carrier wave with a moderate modulation index without introducing either amplitude modulation or distortion in the rate-of-change-of-phase.

What is claimed is:

1. A balanced phase modulator comprising: first and second identical amplitude limiters; means coupled to said limiters for applying a carrier wave to the inputs thereof with equal amplitude and opposite phase and for applying a modulating signal to the inputs of said limiters with equal amplitude and the same phase, the amplitude of the carrier wave at the inputs of said limiters being much greater than the amplitude of the modulating signal; and a potentiometer having its outer ends each individually connected to one output of a different one of said limiters, the slider of said potentiometer forming an output terminal with respect to the remaining output of said limiters.

2. A balanced phase modulator comprising: first and second transistors; means coupled to said transistors for applying a carrier wave to the inputs of said transistors with equal amplitude and opposite phase and for applying a modulating signal to the inputs of said transistors with equal amplitude and the same phase, the amplitude of the carrier wave at the inputs of said transistors being much greater than the amplitude of the modulating signal; first and second tuning inductors each individually connected in parallel with the output of a different one of said transistors, said inductors being resonant with the output capacitance of said transistors at frequencies within the frequency band of the modulated signal; an operating potential applied to said transistors; first and second diodes individually connected in parallel with the output of a different one of said transistors with a first polarity; a first bias potential applied to said first and second diodes; third and fourth diodes individually connected in parallel with the output of a different one of said transistors with a second polarity; a second bias potential applied to said third and fourth diodes, said second bias potential being less than said operating potential by a fixed amount and said first bias potential being greater than said operating potential by the same fixed amount; and a potentiometer having its outer ends each individually connected to one output of a different one of said transistors, the slider of said potentiometer forming an output terminal with respect to the remaining outputs of said transistors.

3. A balanced phase modulator comprising: first and second identical transformers each having a first, second and third winding, one end of each of said first windings being connected together, the remaining ends of said first windings forming carrier wave input terminals, one end of each of said second windings being connected together, the remaining ends of said second windings forming modulating signal input terminals, one end of each of said third windings being connected to a fixed potential, said windings being phased such that a carrier wave applied at said carrier wave input terminals will be out of phase at the remaining ends of said third windings with respect to said fixed potential and such that a modulating signal applied at said modulating signal input terminals will be in phase at the remaining end of said third windings with respect to said fixed potential; first and second transistors each having an input element, an output element and a base, the bases of said transistors being connected to said fixed potential; first and second resistors each being individually connected between the input element of a different one of said transistors and a different one of the remaining ends of said third winding; first and second tuning inductors each individually having one end connected to the output element of a different one of said transistors, the other ends of said inductors being connected together at a junction, said inductors being resonant with the output capacitance of said transistors at frequencies within the frequency band of the modulated signal; an operating potential with respect to said fixed potential being applied at the junction of said inductors; first and second diodes connected in series opposition between the output elements of said transistors with a first polarity arrangement; a first bias potential with respect to said fixed potential being applied at the junction of said first and second diodes; third and fourth diodes connected in series opposition between the output elements of said transistors with a second polarity arrangement; a second bias potential with respect to said fixed potential being applied at the junction of said third and fourth diodes, said second bias potential being less than said operating potential by a fixed amount and said first bias potential being greater than said operating potential by the same fixed amount; and a potentiometer having its outer ends each individually connected to the output element of a different one of said transistors, the slider of said potentiometer forming an output terminal with respect to said fixed potential.

4. A balance phase modulator comprising: first and second identical transformers each having a first, second and third winding, dissimilar ends of said first windings being connected together, and the remaining dissimilar ends of said first windings forming carrier wave input terminals, similar ends of said second windings being connected together, the remaining similar ends of said second windings forming modulating signal input terminals, dissimilar ends of said third windings being connected to a fixed potential; first and second transistors of the PNP type each having an emitter, a collector and a base, the bases of said transistors being connected to said fixed potential; first and second resistors each being individually connected between the emitter of a different one of said transistors and a different one of the remaining dissimilar ends of said third winding; first and second tuning inductors each individually having one end connected to the collector of a different one of said transistors, the other ends of said inductors being connected together at a junction, said inductors being resonant with the collector capacitance of said transistors at frequencies within the frequency band of the modulated signal; a negative operating potential with respect to said fixed potential being applied at the junction of said inductors; first and second diodes each having a cathode and an anode, the cathodes of said first and second diodes being each individually connected to the collector of a different one of said transistors, the anodes of said first and second diodes being connected together at a junction; a first negative bias potential with respect to said fixed potential being applied at the junction of said first and second diodes; third and fourth diodes each having a cathode and an anode, the anodes of said third and fourth diodes being individually connected to the collector of a different one of said transistors, the cathodes of said third and fourth diodes being connected together at a junction; a second negative bias potential with respect to said fixed potential being applied at the junction of said third and fourth diodes, said second negative bias potential being less than said negative operating potential by a fixed amount and said first negative bias potential being greater than said negative operating potential by the same fixed amount; and a potentiometer having its outer ends each individually connected to the collector of a different one of said transistors, the slider of said potentiometer forming an output terminal with respect to said fixed potential.

5. A balanced phase modulator comprising: circuit means having predetermined phase and amplitude characteristics and being responsive to a carrier wave and to a modulating signal for developing two resultant phase-modulated waves, and wave combining means having predetermined phase and amplitude characteristics and being coupled to said circuit means for combining said two resultant waves to develop a phase-modulated output wave, the phase and amplitude characteristics of said circuit means being such that said two resultant waves have large amplitude carrier wave components of opposite phase and have small amplitude modulating signal components of the same phase, and the phase and amplitude characteristics of said wave combining means being such that portions of said modulating signal components are added to each other and portions of said carrier wave components are subtracted from each other to increase the degree of the phase modulation of said output wave, substantially without distortion of the rate of change of phase.

6. A phase modulation circuit comprising: first and second wave combining circuits; means coupled to said wave combining circuits for applying a carrier wave to the inputs thereof with equal amplitude and opposite phase and for applying a modulating signal to the inputs thereof with equal amplitude and the same phase, the amplitude of the carrier wave at the inputs of said first and second wave combining circuits being much greater than the amplitude of the modulating signal, said wave combining circuits each developing phase and amplitude modulated carrier waves, the carrier wave component of said modulated carrier waves being of opposite phase at the outputs of said first and second wave combining circuits, the modulating wave component of said modulated carrier waves being of the same phase at the outputs of said first and second wave combining circuits; first and second amplitude limiting means each individually coupled to the output of a different one of said first and second wave combining means for eliminating the amplitude modulation of said modulated carrier waves; and third wave combining means having separate inputs each individually coupled to the output of a different one of said limiting means for subtracting a portion of the carrier wave components of said modulated waves and adding the modulating wave components of said modulated waves to increase the phase modulation index of the resultant combined modulated wave.

7. A balanced phase modulator comprising: first and second electron devices; means coupled to said electron devices for applying a carrier wave to the inputs of said electron devices with equal amplitude and opposite phase and for applying a modulating signal to the inputs of said electron devices with equal amplitude and the same phase, the amplitude of the carrier wave at the inputs of said electron devices being much greater than the amplitude of the modulating signal; first amplitude limiting means coupled to the output of said first electron device; second amplitude limiting means coupled to the output of said second electron device; and a potentiometer having its outer ends each individually connected to one output of a different one of said limiting means, the slider of said potentiometer forming an output terminal with respect to the remaining outputs of said limiting means.

8. A phase modulation circuit comprising: first and second wave combining circuits; means coupled to said wave combining circuits for applying a carrier wave to the inputs thereof with substantially equal amplitude and opposite phase and for applying a modulating signal to the inputs thereof with substantially equal amplitude and the same phase, the amplitude of the carrier wave at the inputs of said first and second wave combining circuits being much greater than the amplitude of the modulating signal, said wave combining circuits each developing phase and amplitude modulated carrier waves, the carrier wave component of said modulated carrier waves being of opposite phase at the outputs of said first and second wave combining circuits, the modulating wave component of said modulated carrier waves being of the same phase at the outputs of said first and second wave combining circuits; and a third wave combining circuit having separate inputs each individually coupled to the output of a different one of said first and second wave combining circuits for subtracting a portion of the carrier wave components of said modulated waves and adding the modulating wave components of said modulated waves to increase the phase modulation index of the resultant combined modulated wave.

References Cited by the Examiner

UNITED STATES PATENTS

| | | | |
|---|---|---|---|
| 1,719,052 | 7/1929 | Green. | |
| 2,083,747 | 6/1937 | Runge | 332—23 |
| 2,384,789 | 9/1945 | Bell | 332—24 |
| 2,420,199 | 9/1947 | Sanders | 332—43 X |
| 2,822,523 | 2/1958 | Bargellini | 332—22 |

ROY LAKE, *Primary Examiner.*

L. MILLER ANDRUS, K. CLAFFY, ROBERT H. ROSE, A. L. BRODY, *Assistant Examiners.*